United States Patent
Dey et al.

(10) Patent No.: US 10,607,267 B2
(45) Date of Patent: Mar. 31, 2020

(54) SYSTEMS AND METHODS FOR IDENTIFYING POTENTIAL SHOPLIFTING INCIDENTS

(71) Applicant: Walmart Apollo, LLC, Bentonville, AR (US)

(72) Inventors: Anindya Sankar Dey, Kolkata (IN); Sadaf Riyaz Sayyad, Pune (IN)

(73) Assignee: Wal-Mart Stores, Inc., Bentonville, AR (US)

( * ) Notice: Subject to any disclaimer, the term of this patent is extended or adjusted under 35 U.S.C. 154(b) by 37 days.

(21) Appl. No.: 15/583,264

(22) Filed: May 1, 2017

(65) Prior Publication Data

US 2017/0323359 A1 Nov. 9, 2017

Related U.S. Application Data

(60) Provisional application No. 62/332,204, filed on May 5, 2016.

(51) Int. Cl.
*G06Q 30/06* (2012.01)
*G06Q 20/20* (2012.01)
(Continued)

(52) U.S. Cl.
CPC ....... *G06Q 30/0609* (2013.01); *G06Q 20/202* (2013.01); *G06Q 20/208* (2013.01);
(Continued)

(58) Field of Classification Search
CPC ............. G06Q 30/0609; G06Q 20/202; G06Q 20/208; G06Q 20/4016; G07G 1/0072; G07G 3/003; G08B 13/1472; G08B 25/10
(Continued)

(56) References Cited

U.S. PATENT DOCUMENTS 6,189,789 B1 2/2001 Levine et al.
7,780,081 B1 8/2010 Liang
(Continued)

FOREIGN PATENT DOCUMENTS

JP 2008027286 A 2/2008
JP 2008203974 A 9/2008
(Continued)

OTHER PUBLICATIONS

Ness Corporate, Improving Loss Prevention in Retail Stores by Applying Swarm Inteligence (Year: 2015).*
International Search Report and Written Opinlon, for PCT Application No. PCT/US2017/030389, dated Jul. 19, 2017, 10 pages.

*Primary Examiner* — Florian M Zeender
*Assistant Examiner* — Nicole Elena Bruner
(74) *Attorney, Agent, or Firm* — Patterson Thuente Pedersen, P.A.

(57) ABSTRACT

Embodiments relate to systems and methods for identifying potential shoplifting incidents. In one embodiment, a system can receive and analyze information related to a number of items removed from a display and a number of items added to a shopping receptacle. These numbers of items can be detected by weight or load changes sensed by a sensor system, and if the counted numbers of items do not match, the system can flag nearby shopping receptacles via their unique identification numbers as potentially involved in shoplifting incidents.

20 Claims, 6 Drawing Sheets

(51) Int. Cl.

| | | |
|---|---|---|
| *G08B 13/14* | (2006.01) | |
| *G07G 1/00* | (2006.01) | |
| *G07G 3/00* | (2006.01) | |
| *G06Q 20/40* | (2012.01) | |
| *G08B 25/10* | (2006.01) | |
| *G07F 7/00* | (2006.01) | |
| *G08B 13/22* | (2006.01) | |
| *G06K 9/00* | (2006.01) | |
| *G06Q 10/08* | (2012.01) | |
| *G06F 13/10* | (2006.01) | |

(52) U.S. Cl.
CPC ....... *G06Q 20/4016* (2013.01); *G07G 1/0072* (2013.01); *G07G 3/003* (2013.01); *G08B 13/1472* (2013.01); *G08B 25/10* (2013.01); *G06F 13/10* (2013.01); *G06K 9/00* (2013.01); *G06Q 10/087* (2013.01); *G07F 7/00* (2013.01); *G08B 13/14* (2013.01); *G08B 13/22* (2013.01)

(58) Field of Classification Search
USPC .......................................................... 705/21
See application file for complete search history.

(56) References Cited

U.S. PATENT DOCUMENTS

| | | | |
|---|---|---|---|
| 9,892,438 | B1* | 2/2018 | Kundu ............... G06Q 30/0609 |
| 2007/0282665 | A1 | 12/2007 | Buehler et al. |
| 2009/0058644 | A1* | 3/2009 | French .................... A47F 3/002 |
| | | | 340/568.2 |
| 2009/0066515 | A1 | 3/2009 | Kangas |
| 2009/0261974 | A1 | 10/2009 | Bailey |
| 2013/0027561 | A1* | 1/2013 | Lee ....................... G06Q 30/02 |
| | | | 348/150 |
| 2015/0019391 | A1 | 1/2015 | Kumar |
| 2015/0029339 | A1 | 1/2015 | Kobres et al. |
| 2015/0041616 | A1* | 2/2015 | Gentile ................ G06Q 10/087 |
| | | | 248/550 |
| 2015/0095189 | A1 | 4/2015 | Dharssi et al. |
| 2015/0127496 | A1 | 5/2015 | Marathe et al. |
| 2016/0314449 | A1* | 10/2016 | Shmilovitz .......... G06Q 20/202 |

FOREIGN PATENT DOCUMENTS

| | | |
|---|---|---|
| WO | WO0073971 A1 | 12/2000 |
| WO | WO03077569 A1 | 9/2003 |

* cited by examiner

SYSTEMS AND METHODS FOR IDENTIFYING POTENTIAL SHOPLIFTING INCIDENTS

RELATED APPLICATION

The present application claims the benefit of U.S. Provisional Application No. 62/332,204 filed May 5, 2016, which is incorporated herein by reference in its entirety.

TECHNICAL FIELD

Embodiments relate generally to inventory management and more particularly to systems and methods for identifying potential shoplifting incidents based on detected changes in weight related to items removed from retail shelves or other displays.

BACKGROUND

Retailer losses related to shoplifting and other inventory "shrinkage" are significant. In the U.S. alone, the National Research Federation estimates these losses totaled more than $30 billion dollars in 2014. Loss prevention therefore is a significant goal for retailers, in particular ways that enable identification of potential or actual shoplifting incidents without direct monitoring or confrontation by sales associates or other staff. Direct monitoring or confrontation can be expensive, offensive to customers, and sometimes dangerous.

SUMMARY

In an embodiment, a system for identifying a potential shoplifting incident comprises a sensor system comprising a first sensor device associated with a retail display fixture and a second sensor device associated with a shopping receptacle; a communication system comprising a first communication device and a second communication device, the first communication device associated with the retail display fixture and configured to be communicatively coupled with the second communication device associated with the shopping receptacle; and a monitoring device configured to be communicatively coupled with the sensor system and the communication system and to output an alert identifying the shopping receptacle as being involved in a potential shoplifting incident if, in operation, the first communication device and the second communication device indicate that the shopping receptacle is proximate the retail display fixture when the first sensor device senses an item is removed from the retail display fixture and the second sensor device senses the item is not placed in the shopping receptacle.

In an embodiment, a method for identifying a potential shoplifting incident comprises providing a first device to be coupled to a retail display fixture and comprising a first sensor device and a first communication device; providing a second device to be coupled to a shopping receptacle and comprising a second sensor device and a second communication device; and providing a monitoring device configured to be communicatively coupled with the first sensor device, the second sensor device, the first communication device and the second communication device and to, in operation, output an alert identifying the shopping receptacle as being involved in a potential shoplifting incident if the first communication device and the second communication device indicate that the shopping receptacle is proximate the retail display fixture when the first sensor device senses an item is removed from the retail display fixture and the second sensor device senses the item is not placed in the shopping receptacle.

BRIEF DESCRIPTION OF THE DRAWINGS

Embodiments may be more completely understood in consideration of the following detailed description of various embodiments in connection with the accompanying drawings, in which.

DETAILED DESCRIPTION

Figure 1A:
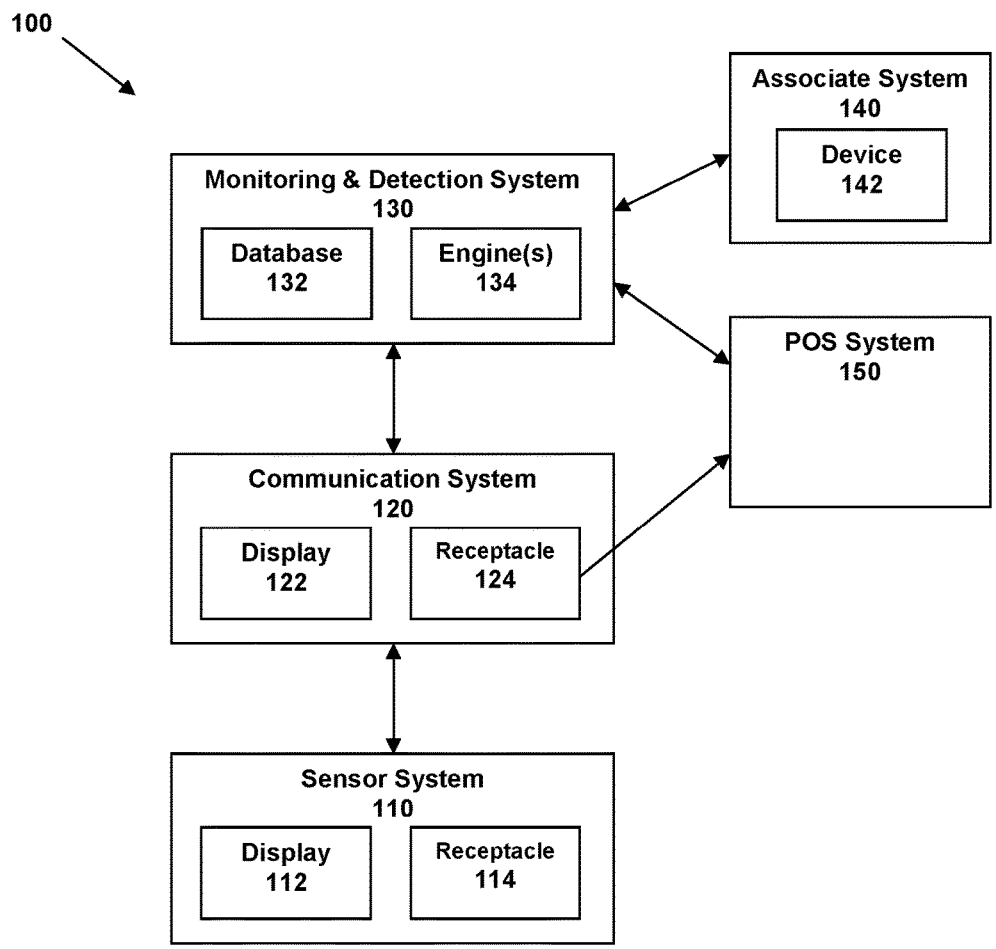
FIG. 1A is a block diagram of a system for identifying potential shoplifting incidents according to an embodiment.

Referring to FIG. 1A, a system 100 for identifying potential shoplifting incidents is depicted. In one embodiment, system 100 comprises a sensor system 110, a communication system 120, a monitoring and detection system 130, an associate system 140, and a point-of-sale (POS) system 150.

System 100 can be deployed in almost any retail space, such as in a "big box," warehouse, shopping center-based, neighborhood or other store. Retail spaces typically comprise displays, including shelves, cases, racks, bars, bins, hooks, floor areas, and other space and devices for storing and displaying merchandise. The general term "display" is used herein to refer to or include any type of display fixture or area. Customers that visit a retail space often use a shopping receptacle to collect and carry items selected for purchase. Examples of shopping receptacles include shopping carts, baskets, rolling baskets, bags and others, and the general term "receptacle" will be used herein to refer to or include any type of shopping receptacle.

Sensor system 110 comprises a display-based sensor device 112 and a shopping receptacle-based sensor device 114. In one embodiment, sensor devices 112 and 114 comprise weight or load sensors that detect a change in weight or load (e.g., that the weight on a shelf decreased because an item was removed, the weight in a shopping receptacle increased because an item was placed in the shopping receptacle) rather than a value of a weight or load, though value-based sensors can be used in other embodiments. Each change in weight or load can be converted into a counter increment or decrement, such that sensor device 112 can provide data related to how many items have been removed from a display while sensor device 114 can provide data related to how many items have been added to the receptacle (or how many total items are in the receptacle, as customers often remove items previously placed in shopping receptacles if they change their mind or find an alternate item). The particular configuration of sensor devices 112 and 114 can vary depending on the type of display and type of receptacle used.

Figure 2:
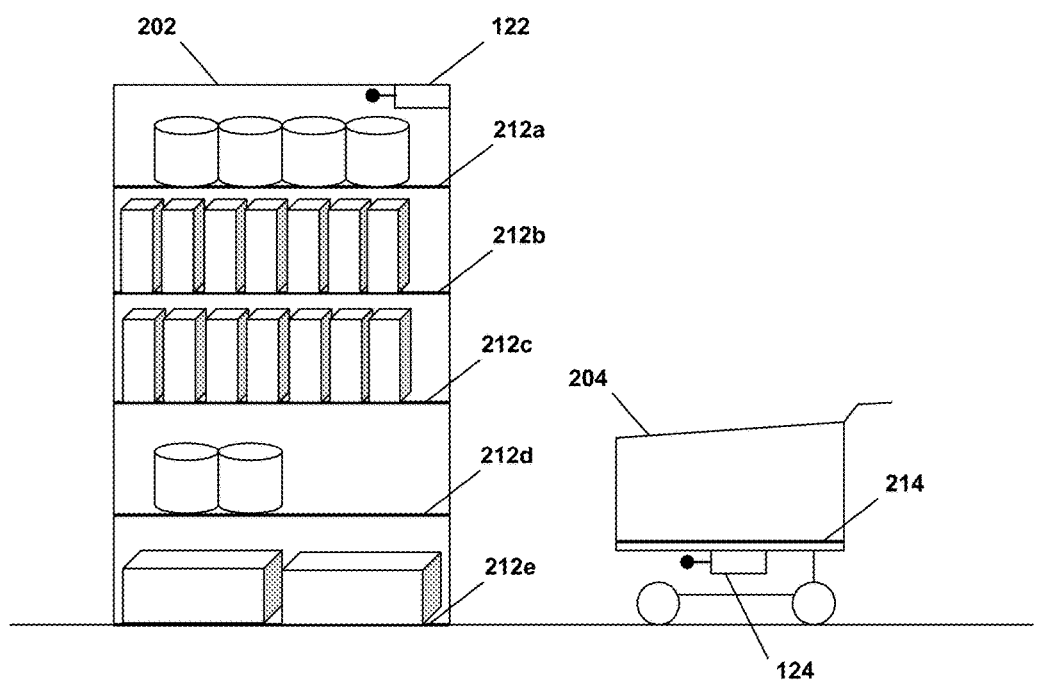
FIG. 2 is a depiction of a display and shopping receptacle according to an embodiment.

For example, and referring also to FIG. 2, in one embodiment in which display-based sensor device 112 is associated with a display 202 (here, a shelving unit), each display element (here, shelves) of display 202 can comprise its own shelf-based sensor device 212a, 212b, 212c, 212d, 212e such that loading changes on any individual display element of display 202 can be sensed. Thus, each shelf of display 202 can be like a scale and counter, such that as items are put on the shelf an increase in weight is sensed and a counter incremented, and as items are removed from the shelf a decrease is sensed and the counter decremented. Similarly, a shopping receptacle 204 (in FIG. 2, a shopping cart) can comprise a scale-like bottom surface 214 comprising sensor device 114, such that as items are added to receptacle 204 a corresponding increase in weight is detected and a counter incremented, and vice-versa as items are removed.

Other types and configurations of sensor devices 112 and/or 114 can be used in other embodiments. For example, different configurations of sensor device 112 can be implemented when display 202 comprises a rack on which items are hung or suspended. Similarly, when shopping receptacle 204 comprises a handheld basket, sensor device 114 can be arranged in the handle or strap such that changes in weight can be sensed. In still other embodiments, sensors other than weight or load sensors can be used, such as proximity or presence sensors, radio frequency identification (RFID) sensors, magnetic sensors, piezoelectric sensors, and others. In general, sensor devices 112 and 114 detect at least one change associated with removing an item from a display and adding an item to a shopping receptacle, respectively.

Communication system 120 comprises a display-based communication device 122 and a shopping receptacle-based communication device 124. In one embodiment, communication devices 122 and 124 comprise wireless communication devices, such as BLUETOOTH, WIFI, RF, infrared or some other type of wireless communication device. In general, communication 120 enables information from sensor system 110 to be communicated to other components of system 100.

Communication system 120, via communication devices 122 and 124 in one embodiment or additional components and features in other embodiments, also can operate as a proximity detection system, enabling system 100 to localize individual shopping receptacles 204 with respect to individual displays 202. The reasons for and use of this proximity feature within system 100 will be discussed in more detail below. In one embodiment, proximity of one or more shopping receptacles 204 to an individual display 202 can be accomplished by a BLUETOOTH or other limited range communication system, as proximity can be detected or established based on the ability of display-based communication device 122 and receptacle-based communication device 124 to communicate with one another. A BLUETOOTH-based system can be advantageous in embodiments in which identification of a single shopping receptacle 204 closest to a particular display 202 is desired, as many BLUETOOTH devices provide communications only between two devices (i.e., one shopping receptacle-based communication device 124 and one display-based communication device 122). In other embodiments, another type of communication system, or an adapted or enhanced BLUETOOTH-based system (e.g., one which comprises a plurality of display-based communication devices 122, each with a BLUETOOTH transceiver) can be implemented such that a particular display 202 can identify a plurality of shopping receptacles 204 in proximity. In general, each display 202 (or an aisle or area in which the display is located) and shopping receptacle 204 will be assigned a number or other identifier so that each can be individually identified within system 100, for reasons that will be discussed in more detail below. The identifier can be retained by one or more of sensor device 114, communication device 124 or another shopping receptacle-based device in communication with devices 114 and 124.

Figure 1B:
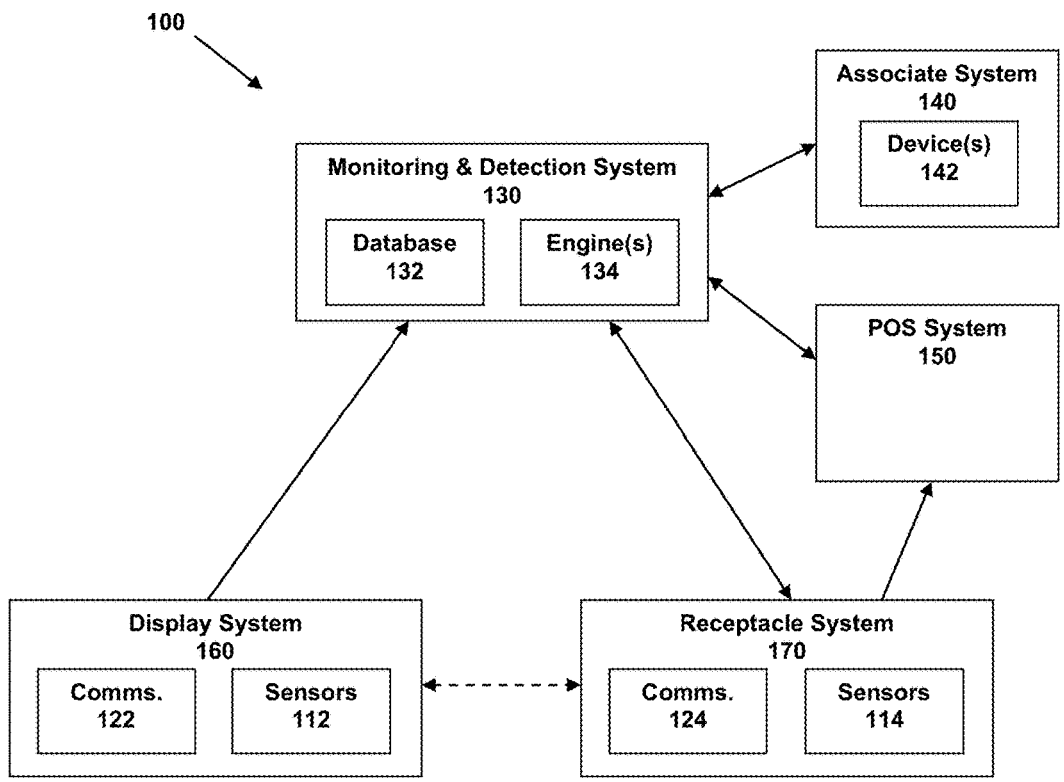
FIG. 1B is an alternate depiction of the system of FIG. 1A.

Another way of considering system 100 is depicted in FIG. 1B, in which instead of depicting sensor system 110 and communication system 120, system 100 is depicted as comprising a display-based system 160 and a shopping receptacle-based system 170. Display-based system 160 comprises the same sensor device 112 and communication device 122, and receptacle-based system 170 the same sensor device 114 and communication device 124, as in FIG. 1A. In some embodiments, sensor device 112 and communication device 122 can be integrated in or otherwise have a common housing, or can be considered to form a module, as can sensor device 114 and communication device 124. Therefore, even though the components of system 100 in FIGS. 1A and 1B are essentially the same, the depiction in FIG. 1B can be a helpful way of viewing relationships and arrangements between some of the components.

Referring to either FIG. 1A or FIG. 1B, system 100 also comprises a monitoring and detection system 130. Monitoring and detection system 130 can comprise a database 132 and at least one module or engine 134. In operation, system 130 can receive information from sensor system 110 via communication system 120, store the information in database 132, analyze (by engine 134) the information to identify potential incidences of shoplifting, and notify other system components (e.g., associate system 140 and/or POS system 150). At a high level, engine 134 of monitoring and detection system 130 analyzes information related to a number of items removed from display 202 or from a plurality of displays (e.g., a number of items removed from all displays 202 in a particular aisle in a store) and a number of items added to shopping receptacles 204. These numbers of items can be detected by weight or load changes sensed by sensor system 110, converted to counter values, and if the counted number of items does not match, monitoring and detection system 130 can flag nearby shopping receptacles 204 via the unique identification number as potentially involved in shoplifting incidents.

"Flagging" shopping receptacles 204 can include providing a notification to associate system 140 and/or POS system 150 and providing at least one of the shopping receptacle 204 identification number or a location so that security personnel or other store employees can monitor or check that shopping receptacle 204 or location. Associate system 140 can comprise a plurality of devices 142 that security personnel and store employees use or access when working. Devices 142 can include workstations, computers, POS systems or devices, pagers, cellphones, walkie-talkie and radio systems, earpieces, kiosks, scanners, smartphones, tablets, laptops, wearable device, and other devices via which employees can receive and often send information related to their work. In a particular example, device 142 comprises a tablet device hosting a mobile application ("app") of system 100. For example, monitoring and detecting system 130 can comprise or administer a mobile app deployed via device 142 to receive notifications and alerts, track suspected shoplifting parties or incidents, communicate information within system 100, and carry out other tasks in or for system 100. In some embodiments, associate system 140 and POS system 150 can be integrated. POS system 150 generally comprises the cash register, scanner, computer, tablet, or other devices used at cash wrap or checkout areas to tally and record customer purchases and accept payment. In some embodiments, monitoring and detecting system 130 can be partially or fully integrated with associate system 140 and/or POS system 150. In other embodiments, these components of system 100 can share or access common features.

Figure 3:
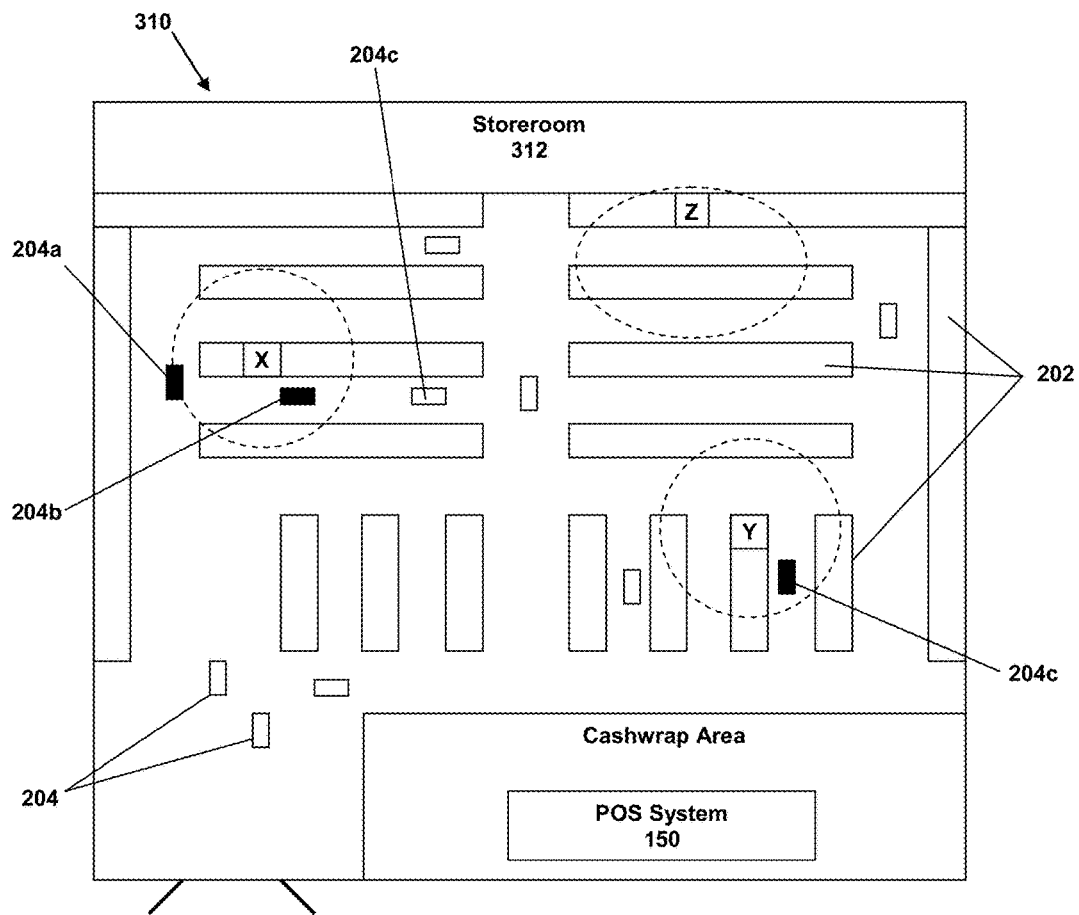
FIG. 3 is a diagram of a retail store in which the system of FIGS. 1A and 1B can be deployed, according to an embodiment.
Figure 4:
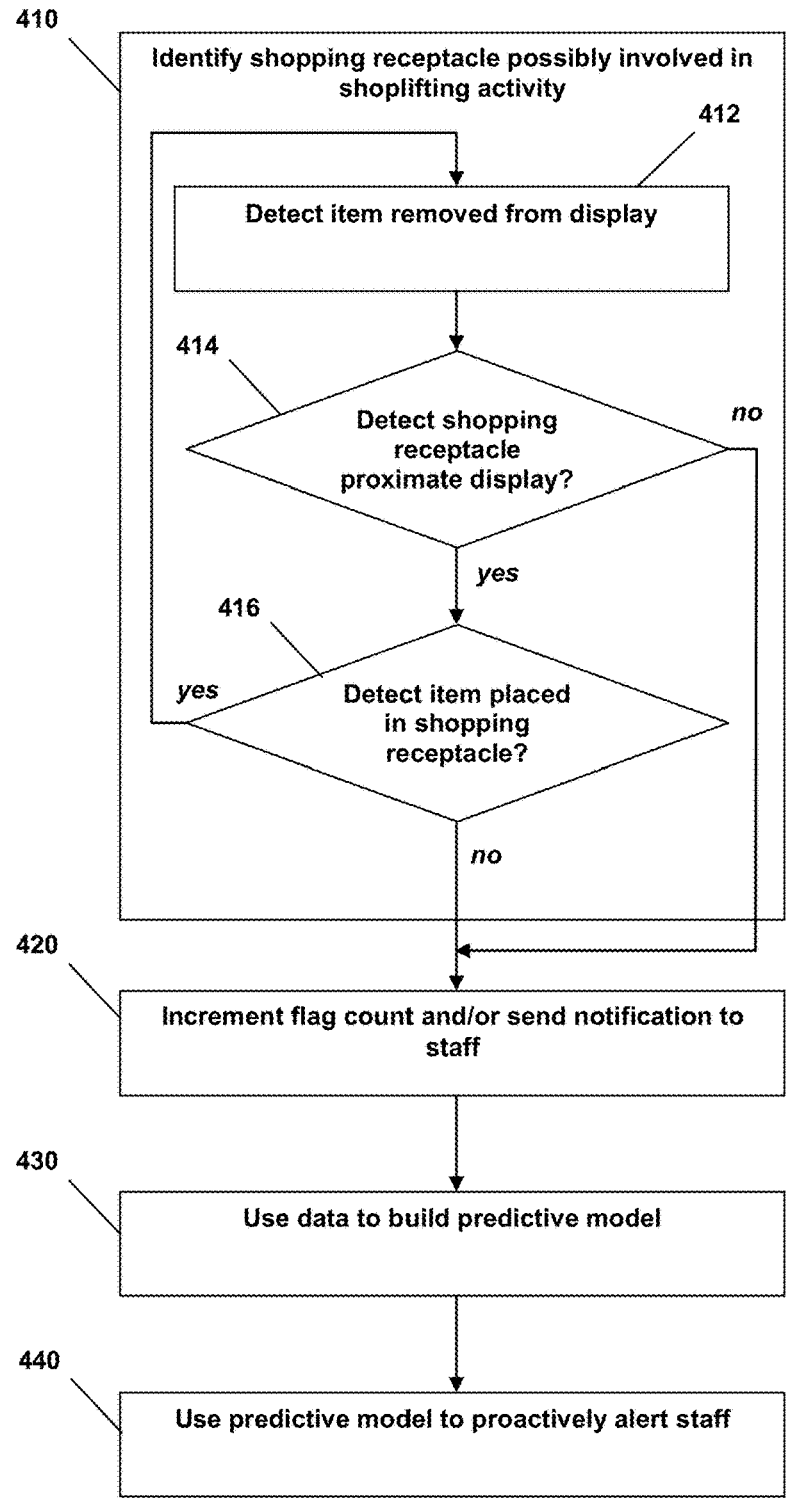
FIG. 4 is a flowchart of a method according to an embodiment.

An example can be provided with reference to FIG. 4 along with FIGS. 1-3. At 410, monitoring and detection system 130 can identify a shopping receptacle 204 possibly involved in a shoplifting incident. This can include receiving data from sensor system 110, via communication system 120, and at 412 determining from that information that an item was removed from display 202.

At 414, engine 134 of monitoring and detecting system 130 can determine whether corresponding data from communication system 120 indicates that a shopping receptacle 204 is proximate display 202. Thus, task 414 can include localizing shopping receptacles 204 to the display 202 from which the item was removed. In the example store 310 of FIG. 3, if an item is detected as having been removed from a display 202 at X, shopping receptacles 204a and 204b can be flagged because of their proximity to X as determined by monitoring and detecting system 130 via data and information from sensor system 110 and communication system 120. The dashed line represents an example proximity range but is only an example, and the proximity can be lesser or greater in other embodiments. For example, engine 134 of monitoring and detecting system 130 could also flag shopping receptacle 204c because it is in the same aisle as X. In embodiments, the proximity can be selected or adjusted based on a variety of factors, including historical data, item value, item type, store demographics, store geography, or some other characteristic. As one example, the proximity range of Z is adjusted because of its location adjacent storeroom 312, which customers would not have access to.

In some embodiments, suspected shoplifting activity can be flagged if an item is detected at 412 as having been removed from a display but there are no shopping receptacles 204 detected near that display 202 at 414. If the result at 414 is "no," monitoring and detecting system 130 can proceed to 420 and flag a potential shoplifting incident.

In other embodiments, suspected shoplifting activity can be flagged if an item is detected at 412 as having been removed from a display, and there are no shopping receptacles 204 near that display, or any shopping receptacles 204 initially detected near that display 202 at that time subsequently move away and out of the proximity range of display 202 without corresponding data from sensor system 110 indicating that an item was added to one of those shopping receptacles 204. This is illustrated, for example, at Z in FIG. 3. Z represents a display location at which an "item removed" was detected at 412. Either at that time or close to that time, monitoring and detecting system 130 determines that no shopping receptacles 204 are proximate Z. Thus, in some embodiments task 414 can comprise two iterations, a first one close in time to task 412 and a second one some predetermined time after task 412. The predetermined time can vary and in embodiments can be 10 seconds, 15 seconds, 30 seconds, one minute, or three minutes, or a longer or shorter time.

At 416, engine 134 of monitoring and detecting system 130 can determine whether corresponding data from sensor system 110 indicates that an item was added to a shopping receptacle 204. Task 416 can include a time window, as customers often pick up items to view them more closely and hold them for some time before either placing them in a shopping receptacle or returning them to the display. Thus, in embodiments, task 416 can include waiting a predetermined amount of time, such as 10 seconds; 15 seconds; 30 seconds; one minute; three minutes; or some other amount of time. In embodiments, the predetermined amount of time can be calibrated for a store or department (e.g., customers may take more time to evaluate fashion accessories than boxed dried pasta, such that the predetermined amount of time for cosmetics displays is one minute and the time for boxed dried pasta is 30 seconds). The predetermined amount of time can be truncated if sensor system 110 subsequently senses that an item was returned to the display.

Engine 134 of monitoring and detecting system 130 can detect multiple possible shoplifting incidents, simultaneously or sequentially. For example, engine 134 also can determine a possible incident has occurred at Y at the same time as X and flag shopping receptacle 204c in addition to shopping receptacles 204a and 204b. In another example, two incidences spaced apart in time could be identified at X and Y, and system 130 can check whether shopping receptacle 204c, proximate the later event at Y, was also in the area of X when that incident took place. Checking and matching data and information like this enables engine 134 and system 130 to flag higher likelihood events or suggest a different response by staff.

If a possible shoplifting event is determined at 410, a notification can be sent by engine 134 to staff at 420. This notification can be sent to one or more devices 142 and can include identification and location information of the shopping receptacle(s) 204 in question (e.g., "Cart number 12345; Aisle 101"). It also can include a number of flags, as in some embodiments a cart or location may need to accumulate a number of flags that exceeds a predetermined threshold (e.g., 1, 2, 3, etc.) before a notification is sent to alert staff. The threshold can be calibrated and adjusted according to a variety of characteristics, such as area of store, time of day, store demographic, department, type of item, other store activity, etc.

In some embodiments, monitoring and detecting system 130 and engine 134 can continue to monitor a location of any flagged or suspected shopping receptacle(s) 204 (either via sensor system 110, communication system 120, or some other localization system available in store 310) and provide that information in real time as part of the notification or in one or more follow up notifications, such as to the aforementioned app displayed on device(s) 142. In one example embodiment, monitoring and detecting system 130 can alert cashwrap/POS or security personnel via POS system 150 when a flagged shopping receptacle 204 approaches to check out or moves toward a store exit. In such an embodiment, POS system 150 can comprise a corresponding device that enables POS system 150 to detect proximate shopping receptacles. In other embodiments, POS system 150 can rely on notifications and alerts from monitoring and detecting system 130.

Figure 5:
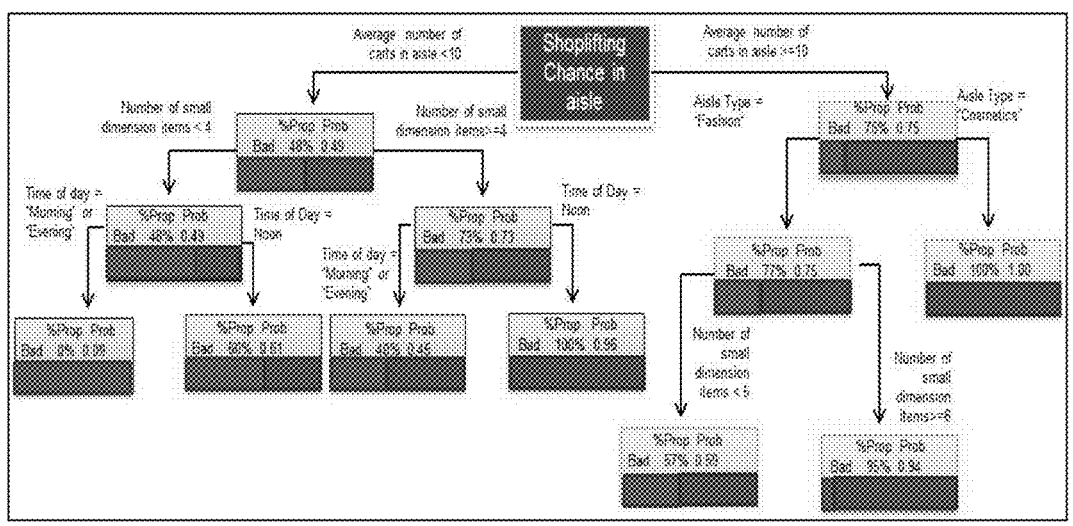
FIG. 5 is an example decision tree model according to an embodiment.

At 430, engine 134 of monitoring and detecting system 130 can use accumulated data from 410 and other data and information stored in database 132 to build a predictive model. The data can include a variety of information, such as: types of items; value of items; areas of the store or types of aisles or displays; data about or obtained from verified shoplifters; data entered by store personnel when a shoplifting suspect is apprehended; times or days when shoplifting is more prevalent; total or average number of shopping receptacles in an aisle or area; store demographics; staffing levels; at an hourly or other time interval, whether shoplifting happened in the store at particular aisle; aisle-wise flag count at an hourly or other time interval; average number of carts per n minute interval in aisle accumulated at an hourly or other time interval; average number of items picked up from an aisle at an hourly or other time interval; number of small dimension items in aisle, which may be more susceptible to shoplifting; etc. From this, monitoring and detecting system can develop and execute a decision tree model 500 like the one depicted by example in FIG. 5. From decision tree model 500, rules can be established, such as:

1. IF number of cart in aisle>=10 and aisle type="Cosmetics" and number of small dimension item>=6, THEN chance of shoplifting is high and alert is sent.

2. IF number of cart in aisle<10 and number of small dimension item>=4 and it is noon, THEN chance of shoplifting is high and alert is sent.

Then, at 440, engine 134 can use the predictive model to proactively alert staff for possible intervention. Staff could be dispatched to an area or alerted to monitor an area (e.g., by closed-circuit or other security systems) when that situation occurs but before a suspected shoplifting incident has been detected, or other action could be taken.

Engine 134 also can identify trends and notify store personnel, such as a manager, if particular items or areas are prone to shoplifting attempts. This can enable a manager to make physical changes in the store, relocate inventory, change display type (e.g., add locks or security features), position staff, configure security cameras, or take other preemptive or other intervening actions to reduce shoplifting attempts.

In some embodiments, engine 134 also can utilize information from POS system 150, either to identify a potential shoplifting incident taking place or in a predictive model. For example, in one embodiment engine 134 can receive and compare information from sensor system 110 and information from POS system 150 for a shopping receptacle 204 and output an alert if the comparison indicates a potential shoplifting incident.

Thus, embodiments can be deployed in almost any retail environment. Security and asset protection personnel currently operate on experience and intuition, and embodiments of system 100 can supplement and enhance their work, functioning as an add-on tool rather than a replacement of human skill. Embodiments of system 100 can help detect shoplifting incidents and enable intervention with increased information and certainty, resulting in reduction of shrinkage losses even during peak sales times when manual detection becomes difficult or impossible. Embodiments of system 100 also can improve customer relations satisfaction by decreasing shoplifting accusations of innocent customers. Additionally, by implementing a predictive model shoplifting incidents and insights from local patterns, store managers can realign the store to increase visibility of product categories that are prone to shoplifting. Store managers also can use these insights to plan for peak sales times.

Still other embodiments of system 100 can provide additional features, such as using the display counters (e.g., display sensors 112 of sensor system 110) for in-store inventory calculations and supply chain management by automatic triggering signals if a number of items in a shelf reduces below a threshold. If used at a shelf level, sensor system 110 also can detect the number of items 10 removed from a display by calculating the reduction in weight from the display with the average weight of an item on the display, improving inventory management and replenishment. System 100 also can help analyze and understand demand patterns of various items and improve crowd handling procedures during peak demand times (e.g., holiday shopping seasons).

In embodiments, system 100 and/or its components or systems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

In embodiments, the system or components thereof can comprise or include various modules or engines, each of which is constructed, programmed, configured, or otherwise adapted, to autonomously carry out a function or set of functions. The term "engine" as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A system for identifying a potential shoplifting incident comprising:
    a sensor system comprising a first sensor device associated with a retail display fixture and a plurality of second sensor devices each associated with a different one of a plurality of shopping receptacles;
    a communication system comprising a first communication device and a plurality of second communication devices, the first communication device associated with the retail display fixture and configured to be communicatively coupled with each of the second communication devices, each of the second communication devices associated with one shopping receptacle of the plurality of shopping receptacles; and
    a monitoring device configured to be communicatively coupled with the sensor system and the communication system, to:
        flag a first shopping receptacle of the plurality of shopping receptacles as being involved in a potential shoplifting incident if, in operation, the first communication device and the second communication device associated with the first shopping receptacle indicate that the first shopping receptacle is proximate the retail display fixture when the first sensor device senses an item is removed from the retail display fixture and the second sensor device associated with the first shopping receptacle senses the item is not placed in the first shopping receptacle,
        flag a second shopping receptacle of the plurality of shopping receptacles as being involved in a potential shoplifting incident if, in operation, the second communication device associated with the first shopping receptacle and the second communication device associated with the second shopping receptacle indicate that the first shopping receptacle is proximate the second shopping receptacle when the first shopping receptacle is flagged as being involved in a potential shoplifting incident, and
        track the number of times each shopping receptacle of the plurality of shopping receptacles is flagged as involved in potential shoplifting incidents and output an alert if the number exceeds a predetermined threshold in a predetermined period of time for at least one shopping receptacle of the plurality of shopping receptacles.

2. The system of claim 1, wherein the sensor system comprises a weight sensor system in which the first sensor device is configured to sense a change in weight on the retail display fixture when an item is removed from the retail display system and each second sensor device is configured to sense a change in weight when an item is placed in the associated shopping receptacle.

3. The system of claim 2, wherein the weight sensor system comprises a counter and is configured to increment or decrement the counter in accordance with a sensed change in weight.

4. The system of claim 1, wherein each shopping receptacle comprises at least one of a shopping cart, a shopping basket, or a shopping bag.

5. The system of claim 1, wherein the retail display fixture comprises at least one of a shelf, a rack, a hook, a bar, a bin, a case, a basket, or a floor area.

6. The system of claim 1, wherein the monitoring device is configured to flag the first shopping receptacle as being involved in a potential shoplifting incident if, in operation, the first communication device and the second communication device indicate that the first shopping receptacle is proximate the retail display fixture when the first sensor device senses an item is removed from the retail display fixture and the second sensor device associated with the first shopping receptacle senses the item is not placed in the shopping receptacle within a predetermined amount of time.

7. The system of claim 6, wherein the predetermined amount of time is selected from the group consisting of: 10 seconds; 15 seconds; 30 seconds; one minute; and three minutes.

8. The system of claim 6, wherein the monitoring device is configured to flag the first shopping receptacle as being involved in a potential shoplifting incident if, in operation, the first communication device and the second communication device associated with the first shopping receptacle indicate that the first shopping receptacle is proximate the retail display fixture when the first sensor device senses an item is removed from the retail display fixture and the second sensor device associated with the first shopping receptacle senses the item is not placed in the first shopping receptacle before the first communication device and the second communication device indicate that the first shopping receptacle is no longer proximate the retail display fixture.

9. The system of claim 1, wherein the communication system comprises a wireless communication system.

10. The system of claim 9, wherein the wireless communication system comprises at least one of a BLUETOOTH communication system, a radio communication system, an infrared communication system, or a WIFI communication system.

11. The system of claim 1, wherein:
the sensor system comprises a plurality of first sensor devices each associated with a different one of a plurality of retail display fixtures;
the communication system comprises a plurality of first communication devices and a plurality of second communication devices, each of the plurality of first communication devices associated with a different one of the plurality of retail display fixtures and configured to be communicatively coupled with any of the plurality of second communication devices each associated with a different one of the plurality of shopping receptacles,
wherein the monitoring device is configured to flag at least one of the plurality of shopping receptacles as being involved in a potential shoplifting incident if, in operation, the communication system indicates that the at least one of the plurality of shopping receptacles is proximate a retail display fixture when the sensor system senses an item is removed from the retail display fixture and not placed in the at least one of the plurality of shopping receptacles.

12. The system of claim 1, wherein each second sensor device and each second communication device are arranged in a housing coupled to the associated shopping receptacle.

13. The system of claim 1, further comprising a point-of-sale (POS) system communicatively coupled with the monitoring device, wherein the monitoring device is configured to compare information from each second sensor device and information from the POS system for the shopping receptacle associated with each second sensor device and output an alert if the comparison indicates a potential shoplifting incident.

14. The system of claim 1, wherein the monitoring system is configured to determine a current location of each shopping receptacle and include information about the current location in the alert.

15. The system of claim 1, wherein the monitoring system is configured to output an alert if the sensor system indicates an item was removed from a retail display fixture when no shopping receptacle was proximate the retail display fixture.

16. The system of claim 1, wherein the monitoring system is configured to use historical data from the sensor system and the communication system to identify past shoplifting patterns.

17. The system of claim 16, wherein the monitoring system is configured to use at least one of the historical data, the past shoplifting patterns, or current data from the sensor system and the communication system to predict situations likely to be shoplifting occurrences.

18. A method for identifying a potential shoplifting incident comprising:
providing a first device to be coupled to a retail display fixture and comprising a first sensor device and a first communication device;
providing a plurality of second devices, each of the plurality of second devices to be coupled to a different one of a plurality of shopping receptacles and each of the plurality of second devices comprising a second sensor device and a second communication device; and
providing a monitoring device configured to be communicatively coupled with the first sensor device, the second sensor device of each of the plurality of second devices, the first communication device, and the second communication device of each of the plurality of second devices and to, in operation:
flag a first shopping receptacle of the plurality of shopping receptacles as being involved in a potential shoplifting incident if the first communication device and the second communication device of the second device coupled to the first shopping receptacle indicate that the first shopping receptacle is proximate the retail display fixture when the first sensor device senses an item is removed from the retail display fixture and the second sensor device of the second device coupled to the first shopping receptacle senses the item is not placed in the first shopping receptacle,
flag a second shopping receptacle of the plurality of shopping receptacles as being involved in a potential shoplifting incident if, in operation, the second communication device associated with the first shopping receptacle and the second communication device associated with the second shopping receptacle indicate that the first shopping receptacle is proximate the second shopping receptacle when the first shopping receptacle is flagged as being involved in a potential shoplifting incident, and
track the number of times each shopping receptacle of the plurality of shopping receptacles is flagged as involved in potential shoplifting incidents and output an alert if the number exceeds a predetermined threshold in a predetermined period of time for at least one shopping receptacle of the plurality of shopping receptacles.

19. The method of claim 18, further comprising coupling each second device to one of the plurality of shopping receptacles.

20. The method of claim 18, further comprising coupling the first device to the retail display fixture.

* * * * *